June 21, 1960　　　R. J. McCOMB　　　2,941,564
RAILROAD SPRING WASHER
Filed Nov. 30, 1954
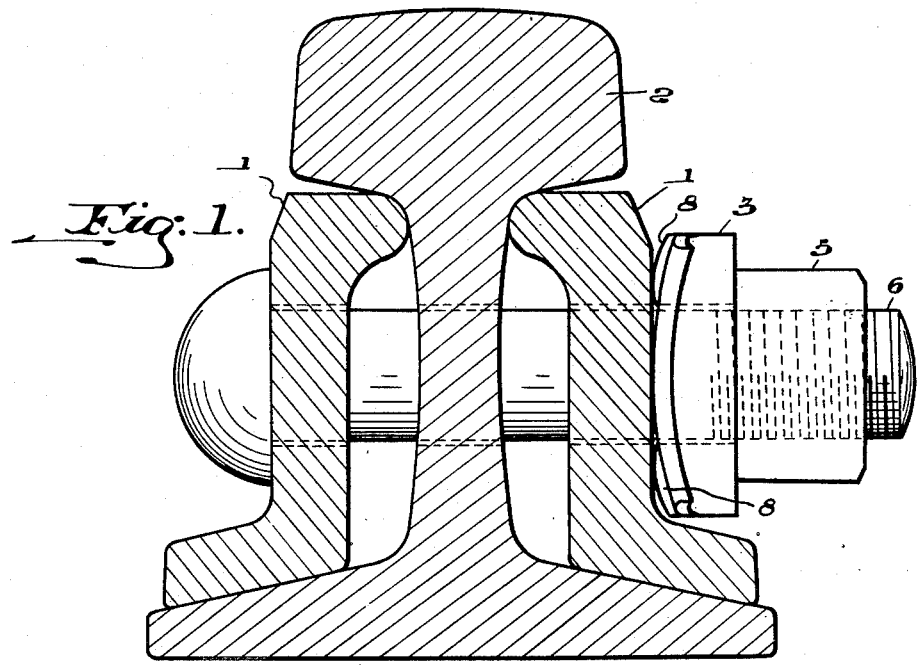
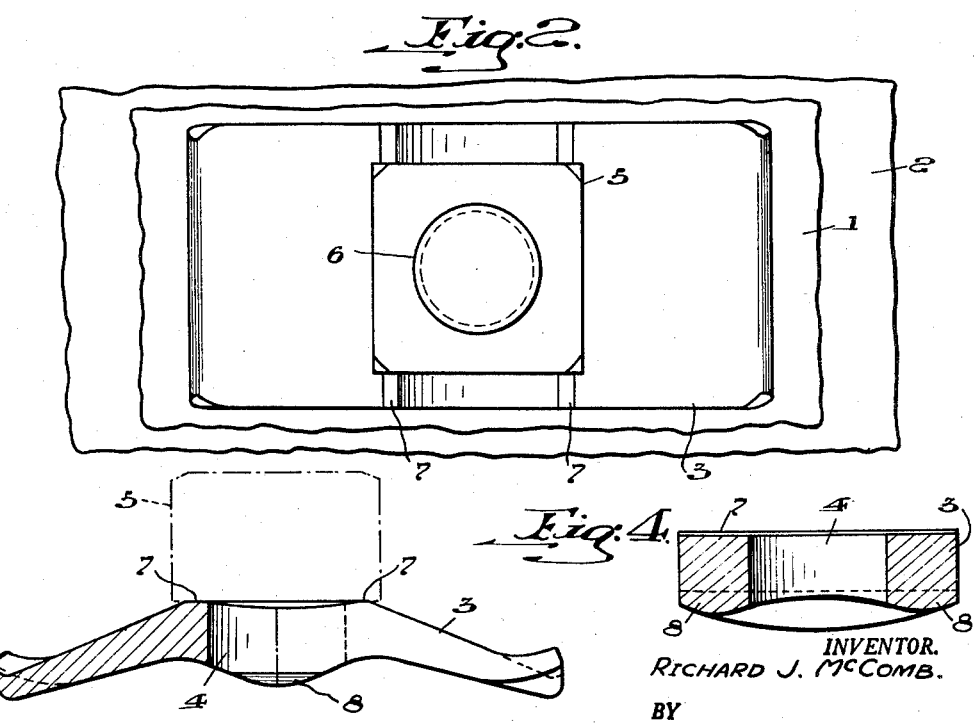
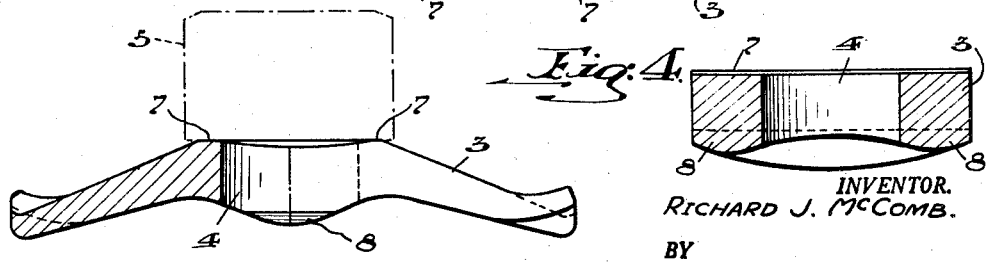
INVENTOR.
RICHARD J. McCOMB.
BY
Brown, Critchlow, Flick & Peckham
his ATTORNEYS.

United States Patent Office 2,941,564
Patented June 21, 1960

2,941,564

RAILROAD SPRING WASHER

Richard J. McComb, 648 Peoples Gas Bldg., Chicago, Ill.

Filed Nov. 30, 1954, Ser. No. 472,022

3 Claims. (Cl. 151—38)

This invention relates to springs, and more particularly to washer-like springs for use as bolt tensioning members and nut locks in rail joint assemblies.

In rail joint assemblies, a spring washer is used between the nut and adjoining bar to maintain the desired tension on the bolt which clamps the splice bars against the rails. Such a joint is shown in Patent 2,247,959. The spring washer shown in that patent was an improvement on those known before, but there have been cases where the washer has cracked or broken along its vertical center line. This seems to be due to the concentration of pressure of the nut against the curved narrow portions of the washer above and below the bolt hole where the washer is weakest. Also, it has been found that the opposite ends of the bolt hole often are encircled by a rough edge due to the drag of metal during the punching operation. This punch drag interferes with good seating of the central part of the washer against a splice bar, and it also scores the inner face of the nut, as does the shear drag at the edge of the washer.

It is among the objects of this invention to provide a spring washer which is stronger than those known heretofore, and in which punch and shear drag will not be objectionable.

In accordance with this invention a generally rectangular spring washer is bowed outwardly lengthwise. A bolt hole extends through the central portion of the washer. This central portion is thickened to provide a pair of inwardly projecting abutments on opposite sides of the hole midway between the ends of the washer. The abutments are convex, so that they will engage the inner compression member, e.g., a splice bar, at points spaced from the bolt hole upon partial flattening of the washer. Extending transversely across the outer surface of the washer a short distance from the bolt hole on each side of it is a narrow flat area. The outer surface between these two areas is concave lengthwise of the washer; therefore only the flat areas are engaged by the outer compression member, i.e., the nut on the bolt. Consequently, the pressure of the nut against the washer is concentrated on flat areas of the washer away from the bolt hole.

The preferred embodiment of the invention is illustrated in the accompanying drawings, in which Fig. 1 is a vertical section through a rail joint showing the compressed spring washer in end elevation;

Fig. 2 is a fragmentary side view of the joint;

Fig. 3 is an edge view of the washer, partly in central longitudinal section; and Fig. 4 is a central transverse section of the washer.

Referring to the drawing, splice bars 1 are clamped against the sides of adjacent rail ends 2 by means of nuts and bolts which extend through the rails. A spring washer 3, provided with a central bolt hole 4, is disposed between a nut 5 and splice bar and serves to maintain a constant tension on the bolt 6 when the nut is tightened to compress the spring. The washer is elongated lengthwise of the splice bar and preferably is substantially rectangular. Also, the washer is bowed lengthwise and outwardly away from the splice bar so that the washer can be flattened to some extent when the nut is tightened against it. Preferably, the corners of the washer are bent outward, which can be done by curving the ends of the washer transversely as shown in Fig. 1. Then, if the washer is used between non-parallel compression members, such as a nut and an inclined splice bar, the areas of contact between the ends of the washer and the bar will be near the longitudinal center line of the washer.

It is a feature of this invention that this washer is so formed that it is less likely to break than similar washers known heretofore. Accordingly, its outer surface is provided with a pair of narrow flat areas 7 extending vertically across the washer a short distance from the bolt hole and on opposite sides of it in locations where the nut can engage them. Preferably, these areas are substantially straight and parallel with each other. The surface of the washer between these flat areas is concave lengthwise of the washer, as shown in Fig. 3. Consequently, the pressure of the nut against the washer is concentrated only on the flat areas away from the bolt hole. The concave surface between the flat areas generally does not touch the nut. As a result of this construction the drag that may be left around the outer end of the bolt hole by the punch that formed the hole will be within the space between the nut and concave surface of the washer and will not interfere with the tightening of the nut.

Another advantage is that the load exerted by the nut on the washer is distributed away from the bolt hole and on the strong part of the washer between its ends and the hole, instead of on the weakest part of the washer between its horizontal edges and the bolt hole. Therefore, the washer is stronger than those known heretofore.

The central portion of the washer is thickened above and below the bolt hole to increase its strength at those points and to form a pair of inwardly projecting abutments 8. These abutments seat against the adjoining splice bar when the spring washer is under maximum compression and limit the extent that the washer can be flattened. Another feature of the invention is that abutments 8 are convex, whereby a space is formed all around the inner edge of the bolt hole between it and the adjoining splice bar. Such small drag as may appear when the punch is withdrawn from the inner end of the hole will be located in that space and not interfere with proper engagement of the abutments with the bar.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A generally rectangular spring washer bowed outwardly lengthwise and adapted to be partially flattened between outer and inner compression members, the washer having a central bolt hole and a flat area extending transversely across its outer surface on each side of the hole and spaced from the hole, said areas being in a common plane and adapted to be engaged substantially throughout their width by the outer compression member, the portion of the washer between the flat areas being rigid, and said outer surface between the flat areas being concave lengthwise of the washer, whereby the pressure of the outer compression member will be concentrated against said flat areas away from said hole and from the portions of the washer between the flat areas.

2. A spring washer in accordance with claim 1, in which said flat areas are substantially straight and parallel.

3. A rectangular spring washer bowed outwardly lengthwise and adapted to be partially flattened between outer and inner compression members, the washer having a central bolt hole and an elongated substantially straight area extending across its outer surface on each side of the hole and spaced from the hole, said areas being substantially parallel in a common plane and adapted to be engaged substantially throughout their width by the outer compression member, the portion of the washer between the flat areas being rigid, said outer surface between the flat areas being concave lengthwise of the washer, whereby the pressure of the outer compression member will be concentrated against said flat areas away from said hole and from the portions of the washer between the flat areas, the central portion of said washer being thickened to provide a pair of inwardly projecting circular abutments on opposite sides of said hole midway between the ends of the washer, said abutments being tapered toward their inner ends and adapted to seat against the inner compression member upon partial flattening of the washer.

References Cited in the file of this patent

UNITED STATES PATENTS

| | | |
|---|---|---|
| 259,665 | Broomall et al. | June 20, 1882 |
| 1,037,384 | White | Sept. 3, 1912 |
| 1,641,059 | Tausch | Aug. 30, 1927 |
| 1,793,116 | Monroe | Feb. 17, 1931 |
| 2,072,176 | Monroe | Mar. 2, 1937 |
| 2,247,959 | McComb | July 1, 1941 |

FOREIGN PATENTS

| | | |
|---|---|---|
| 484,536 | Great Britain | May 6, 1938 |